United States Patent
Kim et al.

(10) Patent No.: US 7,570,160 B2
(45) Date of Patent: Aug. 4, 2009

(54) PORTABLE COMPUTER AND METHOD OF CONTROLLING THE SAME

(75) Inventors: Hyung-jun Kim, Suwon-si (KR); Yong-duck Kim, Suwon-si (KR); Hong-kil Park, Suwon-si (KR); Tae-yoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 11/489,581

(22) Filed: Jul. 20, 2006

(65) Prior Publication Data

US 2007/0018956 A1    Jan. 25, 2007

(30) Foreign Application Priority Data

Jul. 25, 2005    (KR) ............... 10-2005-0067551

(51) Int. Cl.
   *G08B 13/08* (2006.01)
(52) U.S. Cl. .............. 340/545.6; 340/691.6; 340/686.1; 361/679.04; 361/679.29
(58) Field of Classification Search .......... 340/545, 340/545.1–545.9, 686.1, 691.6; 361/679.04, 361/679.29
See application file for complete search history.

(56) References Cited

U.S. PATENT DOCUMENTS 6,489,890 B1 * 12/2002 Inoue ............... 340/568.1
2004/0246666 A1 * 12/2004 Maskatia et al. ......... 361/683

FOREIGN PATENT DOCUMENTS

| JP | 2001-242956 | 9/2001 |
| JP | 2002-163035 | 6/2002 |
| KR | 1999-17510 | 3/1999 |
| KR | 2000-74394 | 12/2000 |
| KR | 2004-19230 | 3/2004 |
| KR | 2004-22117 | 3/2004 |

OTHER PUBLICATIONS

Office Action issued in Korean Patent Application No. 2005-67551 on Jul. 21, 2006.

* cited by examiner

*Primary Examiner*—Benjamin C Lee
*Assistant Examiner*—Ojiako Nwugo
(74) *Attorney, Agent, or Firm*—Stein McEwen, LLP (57) ABSTRACT

A portable computer and a method of controlling the same that can secure safety of circuit and system by interrupting or providing an output of power and/or image signal supplied to a display panel in accordance with results of sensing an operation of a locking unit.

25 Claims, 6 Drawing Sheets

PORTABLE COMPUTER AND METHOD OF CONTROLLING THE SAME

CROSS-REFERENCE TO RELATED APPLICATIONS

This application claims the benefit of Korean Patent Application No. 2005-67551, filed on Jul. 25, 2005, in the Korean Intellectual Property Office, the disclosure of which is incorporated herein by reference.

BACKGROUND OF THE INVENTION

1. Field of the Invention

Aspects of the present invention relate to a portable computer and a method of controlling the same, and more particularly, to a portable computer and a method of controlling the same, in which a display panel can be detached from a system body and it is possible to control an output of power and/or image data supplied from the system body to the display panel.

2. Description of the Related Art

Conventionally, a portable computer is provided with a system body and a display panel. An LCD panel has been generally employed as the display panel. The size of the LCD panel can be 14", 15.4", 17" and 19". The size of LCD panels continues to expand.

Where a portable computer is provided with a relatively expensive LCD, the expensive LCD has to be disposed together with the portable computer due to the usual short life of 2-3 years for the portable computer, resulting in a loss of cost to the consumer.

To overcome such a problem, an improved portable computer has lately appeared that allows the LCD panel to be reused by detaching it from a system body.

The portable computer is generally designed to output power and data to the LCD panel upon turning on power of the system body, whereas in the case of the portable computer in which the LCD panel can be detached, it may utilize technology that the output of the power and the data is interrupted when the LCD panel is detached.

Output of power and data supplied to the LCD panel is interrupted by sensing whether the LCD panel is detached from a connector. However, in this case, since the output of the power and the data will be interrupted in accordance with whether connectors on the system body and LCD panel are connected, it results in a circuit failure due to a sudden voltage change of the power and the data even after interruption. Further, even in a state of interrupting the power and the data supplied to the LCD panel, the power and the data may remain in the connectors, which results in a problem that the portable computer can not secure safety of the system.

SUMMARY OF THE INVENTION

Aspects of the present invention provide a portable computer and a method of controlling the same that can secure safety of circuit and system by interrupting or providing an output of power and/or image signal supplied to a display panel according to results of sensing an operation of a locking unit.

Additional aspects and/or advantages of the invention will be set forth in part in the description which follows and, in part, will be obvious from the description, or may be learned by practice of the invention.

According to an aspect of the present invention, there is provided a portable computer comprising: a system body; a display panel to which a power signal and an image signal are supplied from the system body; a locking unit provided on a surface of the system body to attach and detach the display panel to/from the system body; a locking sensing unit to sense an operational state of the locking unit; and a control unit to interrupt the power supplied from the system body to the display panel if it is determined that the locking unit is opened based on a sensing signal of the locking sensing unit.

The control unit may, although not necessarily, interrupt the image signal supplied from the system body to the display panel if it is determined that the locking unit is opened based on the sensing signal of the locking sensing unit.

The system body may, although not necessarily, further comprise a wireless LAN unit, and the control unit interrupts a wireless LAN signal supplied from the wireless LAN unit to the display panel if it is determined that the locking unit is opened based on the sensing signal of the locking sensing unit.

The system body may, although not necessarily, further comprise a connector to which the display panel is connected and which has a power supply pin and an image signal supply pin through which the power signal and the image signal are transmitted, and a connector sensing unit to sense whether the display panel is connected to the connector; and wherein the control unit maintains the transmission of the power signal and the image signal to the display panel if it is determined that the locking unit is closed and the display panel is connected to the connector based on the sensing signals from the locking sensing unit and the connector sensing unit.

The control unit may, although not necessarily, interrupt the power signal and the image signal supplied to the display panel if it is determined that the locking unit is closed and the display panel is not connected to the connector based on the sensing signal from the locking sensing unit and the connector sensing unit.

The system body may, although not necessarily, comprise an internal output mode of outputting the image signal to the display panel and an external output mode of outputting the image signal to an external display device; and the control unit uses the external output mode of the system body if it is determined that the locking unit is closed and the display panel is not connected to the connector based on the sensing signals of the locking sensing unit and the connector sensing unit.

The control unit may, although not necessarily, comprise a sensor circuit to determine whether the display panel is connected to the connector and the locking unit is operated based on the sensing signals of the connector sensing unit and the locking sensing unit, and an execution circuit to control the output of the power signal and the image signal and the output mode from the system body in accordance with determining results of the sensor circuit.

The control unit may, although not necessarily, comprise a microcomputer to determine whether the display panel is connected to the connector and the locking unit is operated based on the sensing signal of the connector sensing unit and the locking sensing unit, and a BIOS to control the output of the power and the image signal from the system body to the display panel.

The control unit may, although not necessarily, provide a wireless LAN signal to an antenna of the display panel if it is determined that the locking unit is closed and the display panel is connected to the connector, and interrupts the wireless LAN signal to it if it is determined that the locking unit is closed and the display panel is not connected to the connector, based on the sensing signals of the connector sensing unit and the locking sensing unit.

The display panel may, although not necessarily, comprise an LCD panel.

According to another aspect of the present invention, there is provided a method of controlling a portable computer comprising a system body, a display panel to be detachable from the system body, and a locking unit to attach and detach the display panel, the method comprising: outputting a sensing signal in accordance with an operational state of the locking unit; and interrupting a power signal and an image signal supplied from the system body to the display panel if it is determined that the locking unit is opened based on the sensing signal according to the operational state of the locking unit.

The system body may, although not necessarily, further comprise a connector having a power supply pin and an image signal supply pin to supply the power signal and the image signal to the display device, and wherein the method further comprises outputting a sensing signal on whether the display panel is connected to the connector.

The interrupting of the power signal and the image signal may, although not necessarily, comprise providing the power signal and the image signal to the display panel if it is determined that the locking unit is closed and the display panel is connected to the connector based on the sensing signal.

The interrupting of the power signal and the image signal may, although not necessarily, comprise interrupting the power signal and the image signal supplied to the display panel if it is determined that the locking unit is closed and the display panel is not connected to the connector based on the sensing signal.

The system body may, although not necessarily, have an internal output mode of outputting the image signal to the display panel and an external output mode of outputting the image signal to an external display device; and wherein the method further comprises converting the output mode of the system body into the external output mode if it is determined that the locking unit is closed and the display panel is not connected to the connector based on the sensing signal.

BRIEF DESCRIPTION OF THE DRAWINGS

These and/or other aspects and advantages of the invention will become apparent and more readily appreciated from the following description of the embodiments, taken in conjunction with the accompany drawings, of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
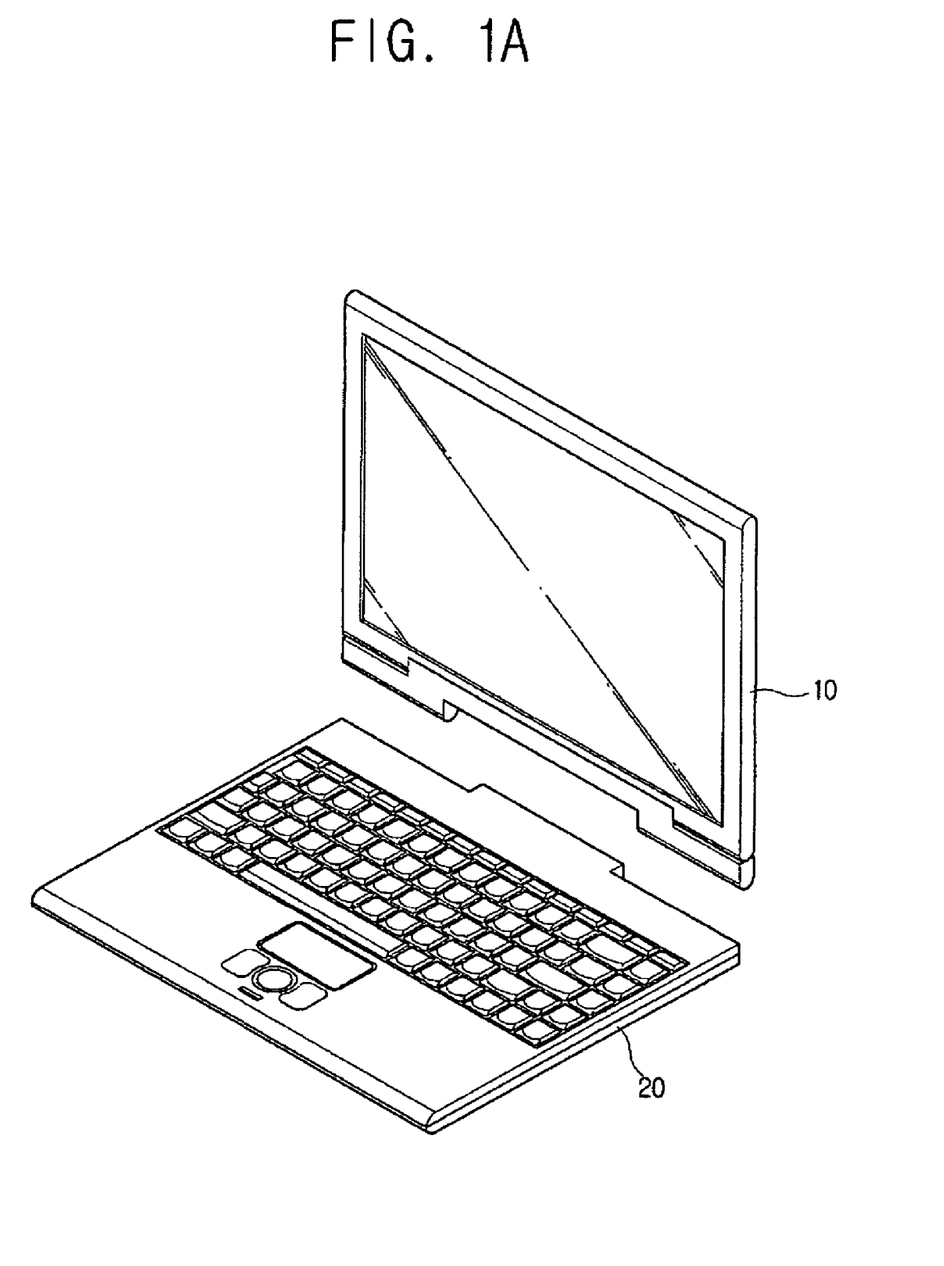
FIGS. 1A and 1B are perspective views of a portable computer according to an embodiment of the present invention.
Figure 1B:
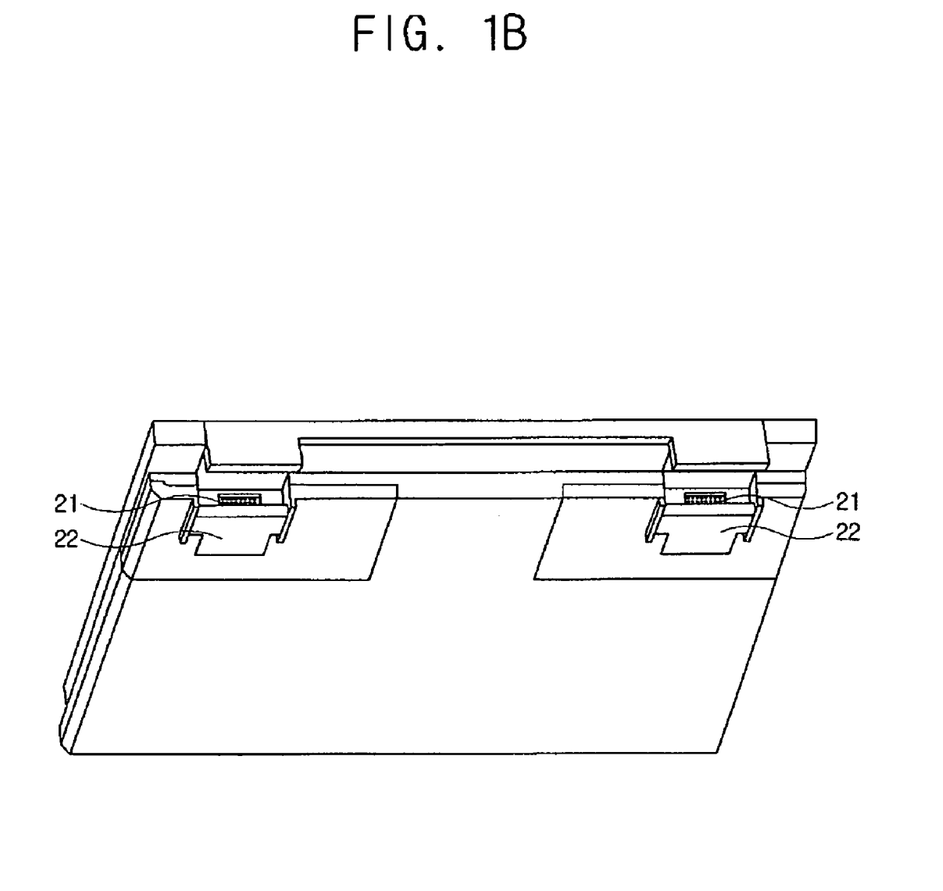

FIGS. 1A and 1B are perspective views of a portable computer according to an embodiment of the present invention.

As illustrated in FIG. 1A, a portable computer comprises an LCD panel 10 and a system body 20, and the LCD panel 10 can be detached from the system body 20. A first connector of the LCD panel 10 is connected with a second connector 21 of the system body 20, through which power and an image signal outputted from the system body 20 can be supplied to the LCD panel 10.

In order to detach the LCD panel 10 from the system body 20, a user has to first open a locking unit 22 provided on a surface of the system body 20, and then separate the first connector 11 from the second connector 21 so that the LCD panel 10 can be detached from the system body 20.

Figure 2:
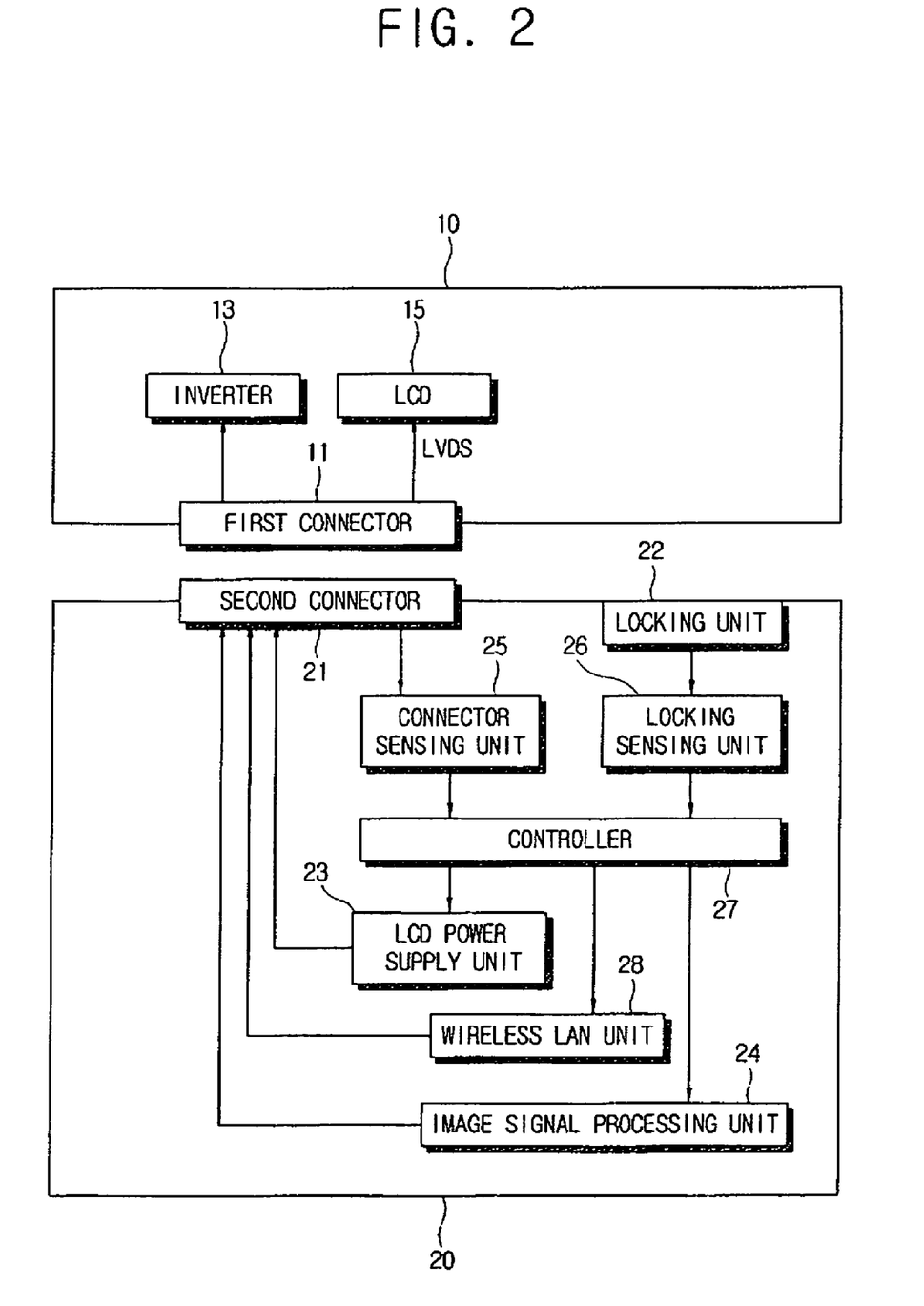
FIG. 2 is a control block diagram of the portable computer according to an embodiment of the present invention.

FIG. 2 is a control block diagram of a portable computer according to an embodiment of the present invention. As illustrated in FIG. 2, the portable computer according to an embodiment of the present invention comprises an LCD panel 10 and a system body 20. The LCD panel 10 comprises the first connector 11, an inverter 13 and an LCD unit 15. The system body 20 comprises the second connector 21, the locking unit 22, an LCD power supply unit 23, an image signal processing unit 24, a connector sensing unit 25, a locking sensing unit 26 and a control unit 27. The portable computer may also comprise other components such as a CPU. The LCD panel and the system body may comprise more than one first connector and second connector, respectively.

The first connector 11 of the LCD panel 10 is connected to the second connector 21 of the system body 20, and the first connector 11 and the second connector 21 each comprises a power line and a data line.

The inverter 13 is driven by power supplied from the LCD power supply unit 23 of the system body 20 to illuminate the LCD unit 15, and the LCD unit 15 receives LVDS (Low Voltage Differential Signaling) data supplied from the image signal processing unit 24 of the system body 20 and displays the LVDS data as an image.

The locking unit 22 is opened and closed before connecting or separating the first connector 11 to/from the second connector 21 to hold an attaching or detaching state when the LCD panel 10 is attached or detached to/from the system body 20. In order to attach or detach the LCD panel 10 to/from the system body 20, the user releases the locking state of the locking unit 22, which is implemented by a latch, a lever, or the like.

The LCD power supply unit 23 outputs the power input from a battery (not shown), an AC adapter (not shown), or another power source (not shown) after converting the power into a voltage level necessary to operate the LCD panel 10, and such operational power outputted from the LCD power supply unit 23 is supplied to the LCD panel 10 through the second connector 21 having a power supply pin. Here, the LCD power supply unit 23 can interrupt or provide the power supplied to the LCD panel 10 in accordance with a control signal of the control unit 27.

The image signal processing unit 24 processes the image signal and then outputs it to the LCD panel 10 The image signal processing unit 24 can provide or interrupt the image signal in accordance with the control signal of the control unit 27.

The connector sensing unit 25 and the locking sensing unit 26 sense the states and/or operations of the second connector 21 and the locking unit 22 respectively and then output sensing signals. The connector sensing unit 25 may be implemented in a variety of ways, including as a general switch circuit, a magnetic switch circuit, etc.

The control unit 27 is operated so as to interrupt or provide the power and the image signal supplied to the LCD panel 10 based on the sensing signal output from the connector sensing unit 25 and the locking sensing unit 26. The control unit 27 may be implemented by a simple sensor circuit comprising a flip-flop circuit and a logic circuit and/or a controller such as a microcomputer.

Herein, the control unit 27 is operated so as to interrupt the power and the image signal supplied from the LCD power supply unit 23 and the image signal processing unit 24 to the LCD panel 10 if the locking sensing unit 26 senses that the locking unit 22 is opened. Accordingly, it is possible to secure safety of the system and the circuit by interrupting the power and the data outputted to the LCD panel 10 before the connectors are separated.

Further, if the connector sensing unit 25 and the locking sensing unit 26 sense that the locking unit 22 is closed and the LCD panel 10 is not connected to the second connector 21, the control unit 27 is operated so as to convert an output mode of the image signal in the system body 20 from an internal output mode of outputting the image signal to the LCD panel 10 into an external output mode of outputting the image signal to an external display device. Accordingly, the system body 20 may be used by attaching the system body to the external display device such as a TV, an external monitor, or the like.

If the connector sensing unit 25 and the locking sensing unit 26 sense that the locking unit 22 is closed and the LCD panel 10 is connected to the second connector 21, the control unit 27 is operated so as to provide the power and the image signal from the LCD power supply unit 23 and the image signal processing unit 24 to the LCD panel 10.

Meanwhile, the system body 20 of the portable computer according to an embodiment of the present invention may comprise a wireless LAN unit 28, and the second connector 21 may further comprise a signal pin through which a signal can be provided from the wireless LAN unit 28 to the LCD panel 10. At this time, the control unit 27 is operated so as to interrupt the signal from the wireless LAN unit 28 to the LCD panel 10 if the locking unit 22 is opened, and provide the signal from the wireless LAN unit 28 to the LCD panel 10 if the locking unit 22 is closed and the LCD panel 10 is connected to the second connector 21.

Figure 3:
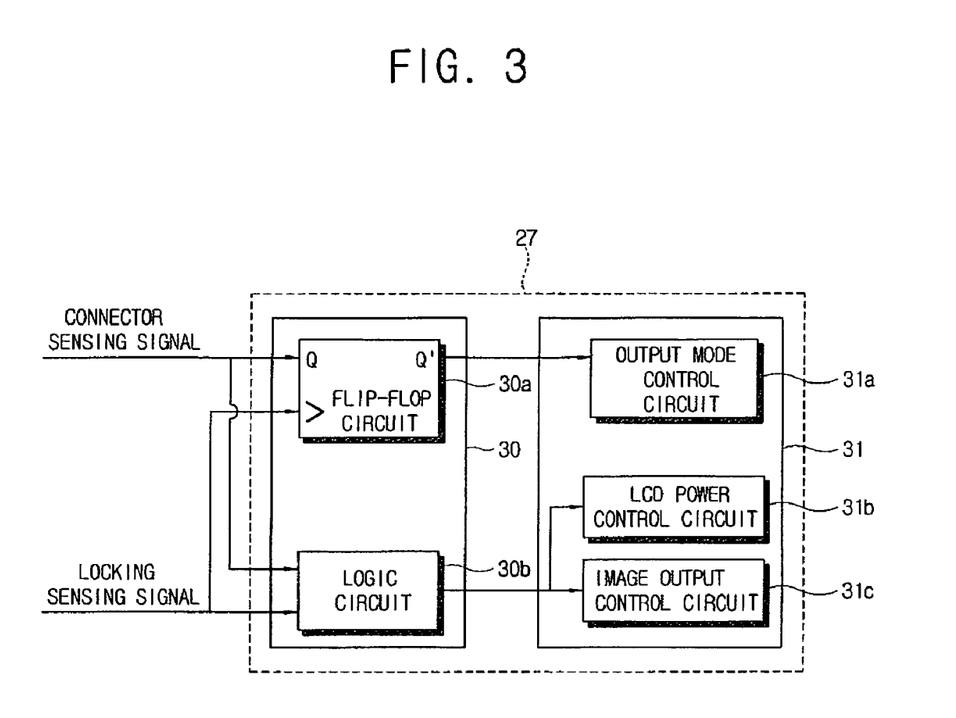
FIG. 3 is a detailed block diagram of a control unit according to a first embodiment of the present invention.

FIG. 3 is a detailed block diagram of the control unit 27 of the portable computer according to a first embodiment of the present invention.

As illustrated in FIG. 3, the control unit 27 according to the first embodiment of the present invention includes a sensor circuit 30 to determine whether the LCD panel 10 is connected and the locking unit 22 is operated according to sensing signals from the connector sensing unit 25 and the locking sensing unit 26, and an execution circuit 31 to control the output of the power and the image signal from the LCD power supply unit 23 and the image signal processing unit 24 according to a determining result of the sensor circuit 30.

The sensor circuit 30 comprises a flip-flop circuit 30a and a logic circuit 30b, and the execution circuit 31 comprises an output mode control circuit 31a, an LCD power control circuit 31b, and an image output control circuit 31c. Herein, the execution circuit 31 may be designed in a variety of ways, including a switching circuit, etc.

An output of the logic circuit 30b in the sensor circuit 30 differs depending on the signal of the locking sensing unit 25 and the connector sensing unit 26. For example, the logic circuit 30b may be designed such that the logic circuit outputs a high signal if the sensing signal is input which indicates that the locking unit 22 is opened, and also outputs a high signal when the sensing signal is applied from the connector sensing unit 25 which indicates that the LCD panel 10 is not connected to second connector 21, even if the sensing signal is inputted which indicates that the locking unit 22 is closed. If the high signal is outputted from the logic circuit 30b, the LCD power control circuit 31b and the image output control circuit 31c interrupt or maintain the interrupting state of the output of the power and the image signal supplied to LCD panel 10, respectively.

Further, if the locking unit 22 is closed and the LCD panel 10 is connected to the second connector 21, the logic circuit 30b outputs a low signal, and the LCD power control circuit 31b and image output control circuit 31c initiate or maintain the output of the power and the image signal supplied to LCD panel 10, respectively.

The flip-flop circuit 30a of the sensor circuit 30 outputs a connector sensing signal Q inputted from the connector sensing unit 25 as an output signal Q' according to an edge component of the locking sensing signal 26. The flip-flop circuit 30a outputs the connector sensing signal Q' to an output mode control circuit 31a if the sensing signal indicates that the locking unit 22 is closed. Consequently, the output mode control circuit 31a is converted into the external output mode of outputting the image signal of the image signal processing unit 24 to the external display device in accordance with the input high signal if the LCD panel 10 is not connected to the second connector 21 so that the high signal is outputted, and converted into the internal output mode of outputting the image signal to the LCD panel 10 if the low signal is inputted. As described above, the sensor circuit 30 and the execution circuit 31 can be designed in a variety of ways.

A control unit 27 of a portable computer according to a second embodiment of the present invention will be described with reference to FIG. 4.

Figure 4:
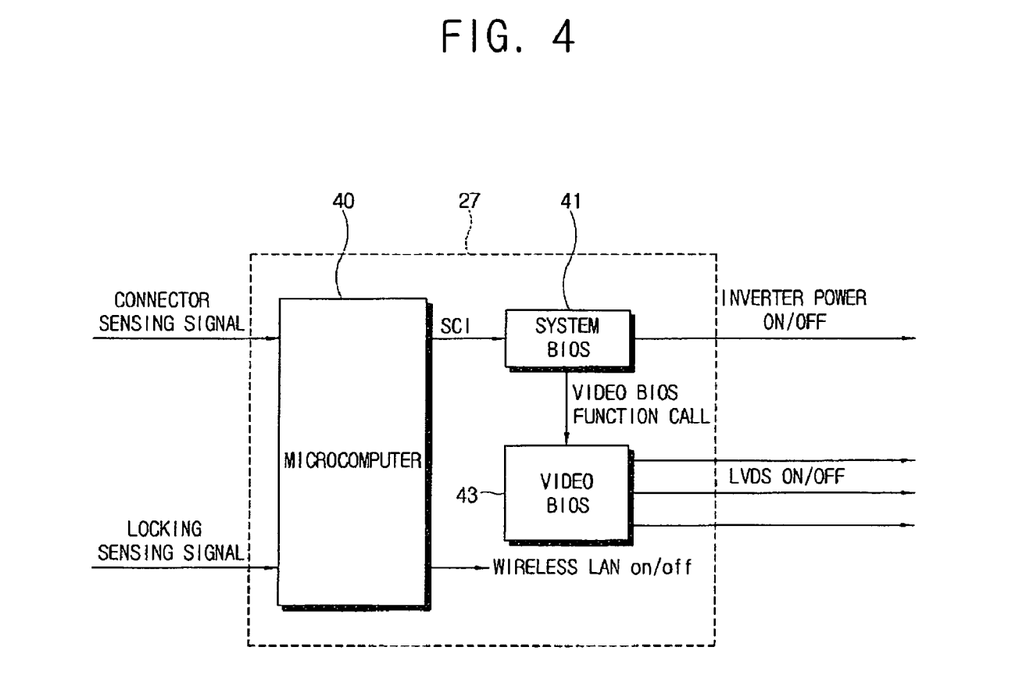
FIGS. 4 and 5 are a detailed block diagram and a flow chart of a control unit, respectively, according to a second embodiment of the present invention.

As illustrated in FIG. 4, the control unit 27 comprises a microcomputer (Micom) 40, a system BIOS 41, and a video BIOS 43.

The respective sensing signals of the connector sensing unit 25 and the locking sensing unit 26 are applied to the Micom 40, and the Micom 40 outputs control signals for making the system BIOS 41 perform an operation in accordance with a certain routine based on the applied connector sensing signal and the locking sensing signal.

The system BIOS 41 controls an on and off function of the power supplied to an inverter 13 of the LCD panel 10 in accordance with the corresponding control signal.

Further, the system BIOS 41 calls a function of the video BIOS 43 in accordance with the corresponding control signal, and the video BIOS 43 accordingly controls an on and off function of LVDS data supplied to the LCD 15.

As described above, if the locking unit 22 is opened, or if the locking unit 22 is closed and the LCD panel 10 is not connected to the second connector 21, the system BIOS 41 and the video BIOS 43 turn off the output of the power and the LVDS data supplied to the inverter 13 of the LCD panel 10, respectively.

Although a second embodiment of the present invention gives an example in which the Micom 40 calls the system BIOS 41 directly, it can also be implemented so that a CPU (not shown) may be informed of corresponding results so as to control the output of the image signal from the image signal processing unit 24.

Figure 5:
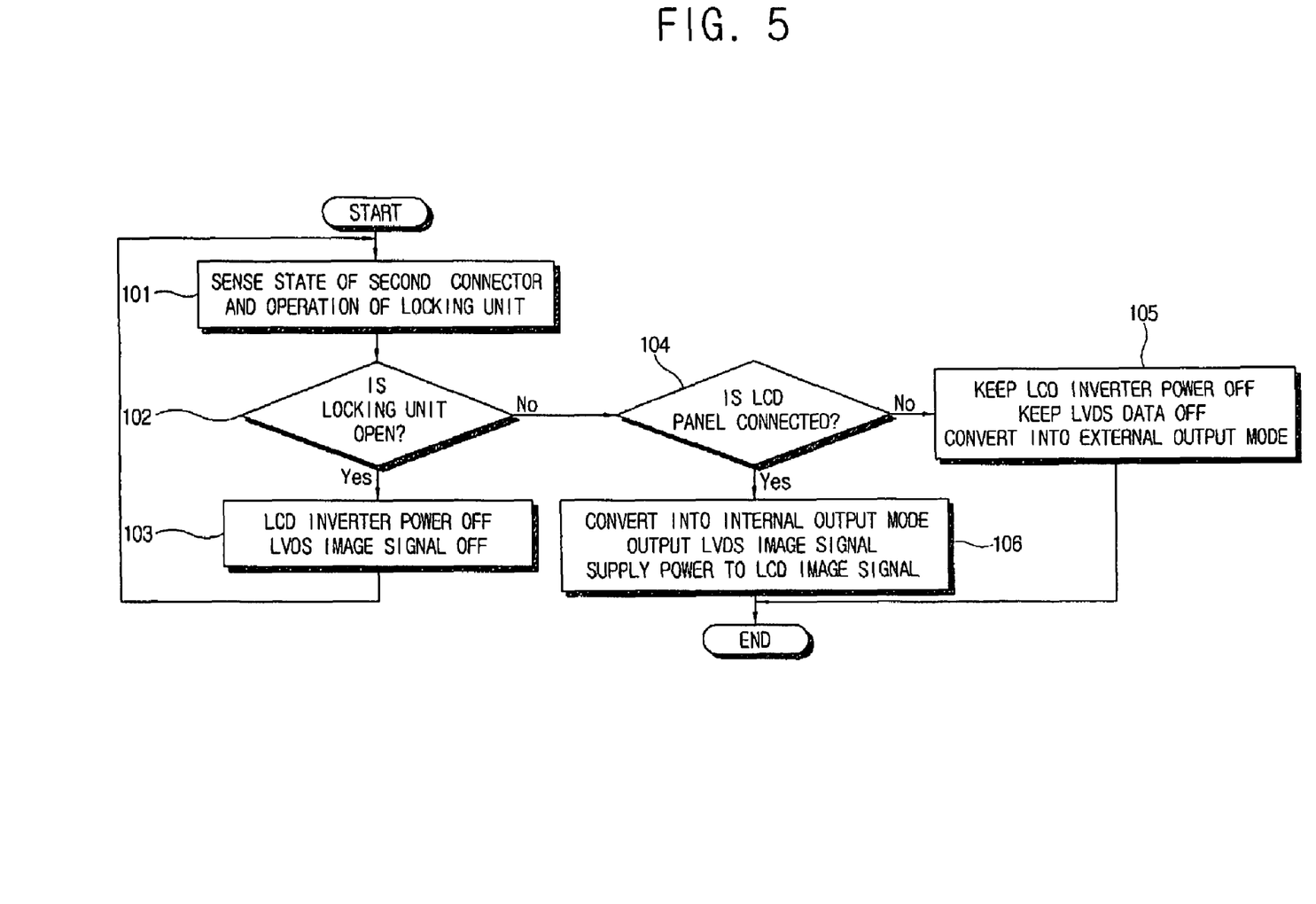

The method of controlling the portable computer according to a second embodiment of the present invention will be now described with reference to FIG. 5.

The connector sensing unit 25 and the locking sensing unit 26 sense a state of the second connector 21 and an operation of the locking unit 22, respectively at operation 101. Then, it is determined whether the locking unit is opened at operation 102. If the locking unit 22 is opened, the locking sensing unit 25 outputs a corresponding sensing signal which indicates that the locking unit 22 is opened, and the Micom 40 calls a certain routine of the system BIOS 41 in accordance with the sensing signal. Accordingly, the system BIOS 41 interrupts the drive power supplied from the LCD power supply unit 23 to the LCD inverter 13 in accordance with a corresponding control signal at operation 103. Also, the system BIOS 41 calls a function of the video BIOS 43, and the video BIOS 43 interrupts the output of LVDS data in the image signal processing unit 24 in accordance with a corresponding control signal at operation 103.

If the locking unit 22 is closed, the Micom 40 outputs a control signal based on the sensing signal from the connector sensing unit 25 on whether the LCD panel is connected or not at operation 104. If it is determined that the LCD panel 10 is not connected to the second connector 21, the Micom maintains the interrupting state of the output of the power and the image signal supplied to the LCD panel 10 at operation 105. Also, the Micom 40 converts the output of image signal in the system body 20 into the external output mode in which the image signal output is outputted to the external display device at operation 105.

If it is determined that the LCD panel 10 is connected to the second connector 21, the Micom 40 converts the output mode in the system body 20 into the internal output mode and provides the corresponding results to the system BIOS 41 so that the system BIOS 41 and the video BIOS 43 are controlled to output the power and the image signal to the LCD panel 10 at operation 106. Therefore, it is possible to secure safety of the system and circuit.

As described above, the present invention provides a portable computer and a method of controlling the same that can secure safety of circuit and system by interrupting or providing an output of power and/or image signal in accordance with results of sensing an operation of a locking unit.

Although a few embodiments of the present invention have been shown and described, it will be appreciated by those skilled in the art that changes may be made in this embodiment without departing from the principle and spirit of the invention, the scope of which is defined in the appended claims and their equivalents.

What is claimed is:

1. A portable computer comprising:
    a system body;
    a display panel to which a power signal and an image signal are supplied from the system body;
    a locking unit provided in the system body to attach and detach the display panel to/from the system body, wherein the display panel cannot be detached from the system body if the locking unit is closed;
    a locking sensing unit to sense an operational state of the locking unit; and
    a control unit to interrupt power supplied from the system body to the display panel if a locking sensing signal of the locking sensing unit indicates that the locking unit is opened,
    wherein the system body comprises:
        a connector to which the display panel is connected, wherein the connector comprises a power supply pin to transmit the power signal and an image signal supply pin to transmit the image signal; and
        a connector sensing unit to sense whether the display panel is connected to the connector.

2. The portable computer as claimed in claim 1, wherein the control unit interrupts the power signal and the image signal supplied from the system body to the display panel if the locking sensing signal of the locking sensing unit indicates that the locking unit is opened.

3. The portable computer as claimed in claim 1, wherein the system body comprises a wireless LAN unit to supply a wireless LAN signal, wherein the control unit interrupts the wireless LAN signal supplied from the wireless LAN unit to the display panel if the locking sensing signal of the locking sensing unit indicates that the locking unit is opened.

4. The portable computer as claimed in claim 1, wherein the control unit allows or maintains a transmission of the power signal and the image signal to the display panel if the locking sensing signal of the locking sensing unit indicates that the locking unit is closed and a connector sensing signal of the connector sensing unit indicates that the display panel is connected to the connector.

5. The portable computer as claimed in claim 1, wherein the control unit interrupts the power signal and the image signal provided to the display panel if the locking sensing signal of the locking sensing unit indicates that the locking unit is closed and the connector sensing signal of the connector sensing unit indicates that the display panel is not connected to the connector.

6. The portable computer as claimed in claim 1, wherein the control unit interrupts the power signal and the image signal provided to the display panel if the locking sensing signal of the locking sensing unit indicates that the locking unit is opened.

7. The portable computer as claimed in claim 1, wherein the system body further comprises an internal output mode of outputting the image signal to the display panel and an external output mode of outputting the image signal to an external display device, wherein:
    the control unit uses the external output mode if the locking sensing signal of the locking sensing unit indicates that the locking unit is closed and the connector sensing signal of the connector sensing unit indicates that the display panel is not connected to the connector; and
    the control unit uses the internal output mode if the locking sensing signal of the locking sensing unit indicates that the locking unit is closed and the connector sensing signal of the connector sensing unit indicates that the display panel is connected to the connector.

8. The portable computer as claimed in claim 7, wherein the control unit comprises:
    a sensor circuit to determine whether the display panel is connected to the connector based on the connector sensing signal of the connecting sensor unit, and whether the locking unit is opened or closed based on the locking sensing signal of the locking sensing unit; and
    an execution circuit to control an output of the power signal, an output of the image signal, and a use of the external output mode or internal output mode in accordance with the determined results of the sensor circuit.

9. The portable computer as claimed in claim 7, wherein the control unit comprises:
    a microcomputer to determine whether the display panel is connected to the connector based on the connector sensing signal of the connecting sensor unit, and whether the locking unit is opened or closed based on the locking sensing signal of the locking sensing unit; and
    a BIOS to control an output of the power signal and an output of the image signal from the system body to the display panel.

10. The portable computer as claimed in claim 9, wherein the BIOS comprises:
    a system BIOS to control an on function and an off function of power supplied to the display panel, and
    a video BIOS to control an on function and an off function of the image signal.

11. The portable computer as claimed in claim 1, wherein the control unit:

provides a wireless LAN signal to an antenna provided on the display panel if the locking sensing signal of locking sensing unit indicates that the locking unit is closed, and the connector sensing signal of the connector sensing unit indicates that the display panel is connected to the connector; and interrupts the wireless LAN signal if the locking sensing signal of the locking sensing unit indicates that the locking unit is closed, and the connector sensing signal of the connector sensing unit indicates that the display panel is not connected to the connector.

12. The portable computer as claimed in claim 1, wherein the display panel comprises an LCD panel.

13. A method of controlling a portable computer comprising a system body, a display panel that can attach to and detach from the system body, and a locking unit to attach and detach the display panel, the method comprising:

outputting a locking sensing signal in accordance with an operational state of the locking unit;

interrupting a power signal and an image signal supplied from the system body to the display panel if the locking sensing signal indicates that the locking unit is opened; and outputting a connector sensing signal to indicate whether the display panel is connected to a connector provided on the system body.

14. The method as claimed in claim 13, wherein the connector comprises a power supply pin to transmit the power signal to the display device, and an image signal supply pin to transmit the image signal to the display device.

15. The method as claimed in claim 13, wherein the interrupting of the power signal and the image signal comprises interrupting the power signal and the image signal to the display panel if the connector sensing signal indicates that the display panel is not connected to the connector.

16. The method as claimed in claim 13, further comprising allowing or maintaining a transmission of the power signal and the image signal to the display panel if the locking sensing signal indicates that the locking unit is closed and the connector sensing signal indicates that the display panel is connected to the connector.

17. The method as claimed in claim 13, wherein the interrupting of the power signal and the image signal comprises interrupting the power signal and the image signal supplied from the system body to the display panel if the locking sensing signal indicates that the locking unit is closed and the connector sensing signal indicates that the display panel is not connected to the connector.

18. The method as claimed in claim 17, wherein the method further comprises:

using an external output mode if the locking sensing signal indicates that the locking unit is closed and the connector sensing signal indicates that the display panel is not connected to the connector, wherein the external output mode comprises outputting the image signal from the system body to an external display device; and using an internal output mode if the locking sensing signal indicates that the locking unit is closed and the connector sensing signal indicates that the display panel is connected to the connector, wherein the internal output mode comprises outputting the image signal from the system body to the display panel.

19. The method as claimed in claim 13, further comprising interrupting a wireless LAN signal to the display panel supplied from a wireless LAN unit provided in the system body if the locking sensing signal indicates that the locking unit is opened.

20. The method as claimed in claim 17, further comprising interrupting a wireless LAN signal to the display panel supplied from a wireless LAN unit provided in the system body if the locking sensing signal indicates that the locking unit is closed, and the connector sensing signal indicates that the display panel is not connected to the connector.

21. A portable computer comprising:

a system body;

a display panel to connect to the connector and to which a power signal and an image signal are supplied from the system body;

a locking unit provided on a surface of the system body to attach and detach the display panel to/from the system body, wherein the display panel cannot be detached from the system body if the locking unit is closed;

a locking sensing unit to sense an operational state of the locking unit;

a connector provided on the system body to connect the display panel;

a connector sensing unit to sense whether the display panel is connected to the connector; and a control unit to interrupt power supplied from the system body to the display panel if a locking sensing signal of the locking sensing unit indicates that the locking unit is opened.

22. The portable computer as claimed in claim 21, wherein the control unit comprises:

a sensor circuit to determine whether the display panel is connected to the connector based on a connector sensing signal of the connecting sensor unit and whether the locking unit is opened or closed based on a locking sensing signal of the locking sensing unit; and an execution circuit to control an output of the power signal, an output of the image signal, and a use of an external output mode or an internal output mode in accordance with determining results of the sensor circuit.

23. The portable computer as claimed in claim 21, wherein the control unit comprises:

a microcomputer to determine whether the display panel is connected to the connector based on a connector sensing signal of the connecting sensor unit and whether the locking unit is opened or closed based on a locking sensing signal of the locking sensing unit; and a BIOS to control an output of the power signal and an output of the image signal from the system body to the display panel.

24. The portable computer as claimed in claim 23, wherein the BIOS comprises:

a system BIOS to control an on function and an off function of power supplied to the display panel, and a video BIOS to control an on function and an off function of the image signal.

25. A method of controlling a portable computer comprising a system body, a display panel that can attach to and detach from the system body, a connector provided on the system body to attach and detach the display panel, and a locking unit to attach and detach the display panel, the method comprising:

outputting a locking sensing signal in accordance with an operational state of the locking unit;

outputting a connector sensing signal to indicate whether the display panel is connected to the connector; and interrupting a power signal and an image signal supplied from the system body to the display panel if the locking sensing signal indicates that the locking unit is opened.

* * * * *